United States Patent Office 3,168,496
Patented Feb. 2, 1965

3,168,496
TERTIARY NITROGEN CONTAINING COPOLYURETHANES FROM 1:4-BIS(HYDROXYMETHYL)-CYCLOHEXANE OR RELATED CYCLIC ETHER COMPOUNDS
Roy McGillivray and Isaac Goodman, Harrogate, England, assignors to Imperial Chemical Industries Limited, London, England, a corporation of Great Britain
No Drawing. Filed Oct. 10, 1960, Ser. No. 61,387
Claims priority, application Great Britain, Oct. 26, 1959, 36,246/59
5 Claims. (Cl. 260—77.5)

This invention relates to novel fibre and film-forming copolyurethanes having improved affinity for dyestuffs.

It is known, for example, from United States Patent 2,511,544 to react hexahydroxylylene glycol with octamethylene diisocyanate to give a polyurethane which softens at 160° C. and is capable of being spun into threads, but it has been found that this and related homopolyurethanes have only poor affinities for the important class of dyestuffs known as anionic dyestuffs.

According to the present invention we provide new copolyurethanes consisting essentially of repeating units of the formula $$[-OCH_2-CH\underset{Y-CH_2}{\overset{CH_2-X}{\diagup\diagdown}}CH-CH_2OCONHRNHCO-]_n$$

where X and Y are the same or differing members of the group comprising —O— and —CH$_2$—, R is a member of the group comprising alkylene, arylene, cycloalkylene and alkylarylene and $n$ is an integer, and repeating units B, having dioxy groups which are different from those in repeating units A, i.e., those having the formula $$-OCH_2-\underset{Y-CH_2}{\overset{CH_2-X}{\diagup\diagdown}}CHCH_2O-$$

said different dioxy groups containing at least one basic tertiary nitrogen atom. We have found that the copolyurethanes of our invention have much improved affinity over homopolyurethanes for acid or anionic dyestuffs. Typical repeating units B are:

$$[-O-(CH_2)_x-\overset{\overset{Z}{|}}{N}-(CH_2)_yO-CONHRNHCO-]_r$$

$$[-O-(CH_2)_x-N\underset{(CH_2)_q}{\overset{(CH_2)_p}{\diagup\diagdown}}N-(CH_2)_y-OCONHRNHCO-]_r$$

and $$[-O(CH_{2m})CH(CH_2)_pOCONHRNHCO]_r$$
$$\qquad\qquad|$$
$$\qquad(CH_2)_s-NX'$$

where $p$, $q$, $r$, $x$ and $y$ are positive integers not including zero,
$m$ and $s$ are zero or positive integers,
Z is an organic radical which may optionally contain nitrogen,
X' comprises two Z radicals which may, if desired, be dissimilar, or an organic diradical which may optionally contain nitrogen.

To achieve the desired dyeability, the proportion of nitrogenous dioxy units introduced need not exceed 30% preferably being between 3 and 30% of all the dioxy units present, but much higher proportions may (as in Example 2) be introduced without impairing the desirable high melting characteristics of the copolyurethanes. In contrast, the known polyurethane of formula:

$$[-O(CH_2)_2\overset{}{N}\underset{}{\diagup\diagdown}N(CH_2)_2O.CONH(CH_2)_6NHCO-]_n$$

described in "Synthetic Fibre Developments in Germany" (C.I.O.S. File No. XXXIII-50. H.M.S.O., London, 1946), although dyeable with anionic dyes, had the unsatisfactorily low melting point of 160° C.

The new copolyurethanes may be prepared:
(1) By interaction of one or more members of the group consisting of 1:4-bis(hydroxymethyl)cyclohexane, 2:5-bis(hydroxymethyl-tetra-hydro-pyran and 2:5-bis-(hydroxymethyl)-1:4-dioxan with one or more diisocyanates of the class OCN—R—NCO; (2) by interaction of bischloroformates of one or more of the diols in (1) with one or more diamines of the class H$_2$N—R—NH$_2$ or (3) by urethane interchange with one or more of the diols of (1) with one or more urethanes of the formula R$^1$O CONHRNHCOOR$^1$ where R is alkylene, arylene, cycloalkylene or alkylarylene and R$^1$ is alkyl, cycloalkyl or aryl and in which reactions a proportion of the diols, bischloroformates or bisurethanes is replaced by similar diols, bischloroformates or bismethanes containing a basic tertiary nitrogen substituent.

The following examples illustrate but in no way limit the scope of our invention.

*Example 1*

In this example we describe polyurethanes corresponding to the formula $$[-OCH_2C\underset{Y-CH_2}{\overset{CH_2-X}{\diagup\diagdown}}CHCH_2O\,|\,CONH.R.NHCO]_n$$
$$\qquad\qquad(A)\qquad\qquad\qquad(B)$$

which differ from the products of the present invention in that they have not been modified by the replacement of a proportion of the dioxy units A by other dioxy units containing at least one tertiary nitrogen atom. The following polyurethanes were made by heating together equimolar proportions of a diol capable of yielding the dioxy unit A and a diisocyanate capable of yielding unit B.

| Reactants yielding unit | | Properties of resulting polymer |
|---|---|---|
| A | B | |
| 1:4-bis(hydroxymethyl) cyclohexane (cis/trans ratio 20:8). | Tetramethylene diisocyanate. | Crystalline, fibre-forming, M. Pt. 198–201° C. |
| 2:5-bis(hydroxymethyl) 1:4-dioxan. | _____do_____ | Crystalline, fibre-forming, M. Pt. 218–232° C. |
| 1:4-bis(hydroxymethyl) cyclohexane (cis/trans isomer ratio 20:80). | 4:4'-Diisocyanate -3:3'-dimethyl-diphenyl. | Crystalline, fibre-forming, M. Pt. 288–291° C. |
| Do_____ | Hexamethylene diisocyanate. | Crystalline, fibre-forming, M. Pt. 179–182° C. |
| 2:5-bis(hydroxymethyl) 1:4-dioxan. | _____do_____ | Crystalline, fibre-forming, M. Pt. 200–202° C. |
| 1:4-bis(hydroxymethyl) cyclohexane (cis/trans isomer ratio 20:80). | 1:5-Diisocyanate naphthalene. | Initially amorphous polymer, S. Pt. 300–310° C. |
| Do_____ | 1:4-Diisocyanate benzene. | Crystalline, unmelted at 350° C. |
| Do_____ | 1:3-bis(isocyanatomethyl) benzene. | Crystalline, fibre-forming, M. Pt. 122–124° C. |

When suitable polymers, such as those melting below 300° C. were melt spun, fibres were obtained having excellent mechanical properties but showing only poor affinities for the acid or anionic class of dyestuffs.

Example 2

A mixture of 1:4-bis(hydroxymethyl)cyclohexane (80% trans and 20% cis isomers) (0.9 mole), N,N$^1$-bis-(2-hydroxyethyl)piperazine (0.1 mole) and 3,3$^1$-dimethyl-diphenylylene-4,4$^1$-diisocyanate (1.0 mole) was heated at 120° C. A clear melt formed which shortly became viscous and finally solidified to a crystalline copolymer. This melted at 275–278° C. and fibres prepared therefrom had a good affinity for acid dyes. The intrinsic viscosity of this polymer (measured in o-chlorophenol at 25° C.) was 0.28 and when the polymer was heated in an atmosphere of nitrogen for 1 hour, this was raised to 0.5. The following table shows the melting points of copolymers made by reacting various proportions of N,N$^1$-bis(2-hydroxyethyl)piperazine with 1,4-bis(hydroxymethyl)cyclohexane (80:20 trans:cis) and 3,3$^1$-dimethyldiphenylylene-4,4$^1$-diisocyanate.

| Molar proportion piperazine, percent: | Polymer M. Pt. ° C.) |
|---|---|
| 25 | 262–264 |
| 50 | 242–245 |
| 75 | 233–235 |
| 100 | 224–228 |

Example 3

A mixture of 2,5-bis-(hydroxymethyl)-1,4-dioxan and (80:20, trans:cis isomers) (0.9 mole), N-cyclohexyl 3-azapentan-1:5-diol (0.1 mole) and 3,3$^1$-dimethyldiphenylylene-4,4$^1$-diisocyanate (1.0 mole) was heated at 120° C. A clear melt formed, which shortly became very viscous and finally solidified. The crystalline polymeric product melted at 279–281° C. and fibres prepared therefrom had excellent affinities for acid dyes.

Example 4

A mixture of 2,5-bis(hydroxymethyl)-1,4-dioxan and N,N$^1$-bis(hydroxyethyl)piperazine in the molar ratio 9:1 was reacted with an equivalent amount of 3,3$^1$-dimethyldiphenylylene-4,4$^1$-diisocyanate as in Example 3. The crystalline polymeric product did not melt below 350° C.

What we claim is:

1. Copolyurethanes consisting essentially of repeating units A of the formula

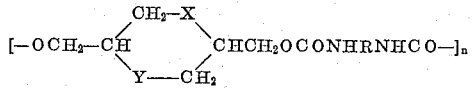

where X and Y are members of the group consisting of —O— and —CH$_2$—, R is a member of the group consisting of alkylene, arylene, cycloalkylene, and alkylarylene and $n$ is a positive integer, and repeating units B of a formula selected from the group consisting of

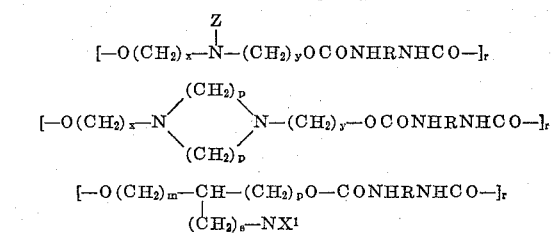

where $p$, $q$, $r$, $x$ and $y$ are positive integers not including zero, $m$ and $s$ are integers and Z and X' are organic radicals.

2. A copolyurethane as set forth in claim 1 in which said repeating unit B has the formula

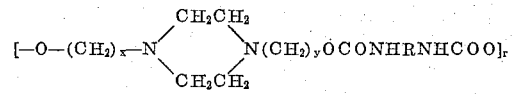

3. A copolyurethane as set forth in claim 1 in which said repeating unit B is of the formula

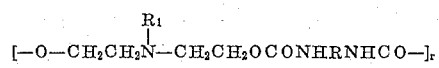

in which R$_1$ is alkyl.

4. A copolyurethane as set forth in claim 1 in which said repeating unit B is of the formula

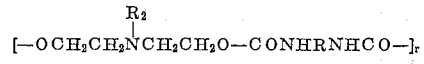

in which R$_2$ is cycloalkyl.

5. A copolyurethane as set forth in claim 1 in which said repeating unit B is of the formula

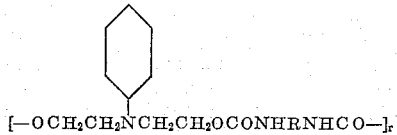

References Cited by the Examiner
UNITED STATES PATENTS

| 2,511,544 | 6/50 | Rinhe | 260—77.5 |
| 2,731,445 | 1/56 | Wittbecker | 260—47 |
| 2,956,961 | 10/60 | Kibler et al. | 260—2.5 |
| 3,036,998 | 5/62 | Rudner | 260—77.5 |
| 3,049,514 | 8/62 | Damusis | 260—32.4 |
| 3,061,559 | 10/62 | Henson | 260—77.5 |

LEON J. BERCOVITZ, *Primary Examiner.*

H. N. BURSTEIN, DONALD E. CZAJA, *Examiners.*